(12) United States Patent
Kariya

(10) Patent No.: US 9,004,186 B2
(45) Date of Patent: Apr. 14, 2015

(54) RESIN LAMINATED FILM FOR ENCLOSING FIRE EXTINGUISHING AGENT AND FIRE EXTINGUISHING EQUIPMENT UTILIZING THE SAME

(75) Inventor: Koushi Kariya, Tokyo (JP)

(73) Assignee: Bonex, Inc., Tokyo (JP)

( * ) Notice: Subject to any disclaimer, the term of this patent is extended or adjusted under 35 U.S.C. 154(b) by 9 days.

(21) Appl. No.: 13/534,338

(22) Filed: Jun. 27, 2012

(65) Prior Publication Data

US 2013/0029064 A1    Jan. 31, 2013

(30) Foreign Application Priority Data

Jul. 29, 2011  (JP) .................................. 2011-167375
Aug. 2, 2011   (JP) .................................. 2011-169102

(51) Int. Cl.
| A62C 8/00 | (2006.01) |
| B32B 1/06 | (2006.01) |
| B32B 27/10 | (2006.01) |
| B32B 27/32 | (2006.01) |
| B32B 27/36 | (2006.01) |

(52) U.S. Cl.
CPC ............. B32B 1/06 (2013.01); *Y10T 428/1303* (2013.01); *Y10T 428/24942* (2013.01); *Y10T 428/1352* (2013.01); B32B 27/10 (2013.01); B32B 27/32 (2013.01); B32B 27/36 (2013.01); *B32B 2255/205* (2013.01)

(58) Field of Classification Search
CPC ...... A62C 19/00; A62C 27/00; A62C 35/023; A62C 35/10; A62C 3/0292; A62C 13/00; A62C 13/76
USPC ............ 169/36, 30, 65, 70; 102/370; 206/219
See application file for complete search history.

(56) References Cited

U.S. PATENT DOCUMENTS

| | | | | |
|---|---|---|---|---|
| 1,671,650 A | * | 5/1928 | Newman et al. ................. | 169/57 |
| 2,873,806 A | * | 2/1959 | Bittner ............................ | 169/36 |
| 2,917,116 A | * | 12/1959 | Wyant ............................. | 169/57 |
| 3,120,273 A | * | 2/1964 | Kaufman et al. ............... | 169/57 |
| 3,774,022 A | * | 11/1973 | Dubrow et al. ................. | 362/34 |
| 5,778,984 A | * | 7/1998 | Suwa .............................. | 169/36 |
| 7,090,029 B2 | * | 8/2006 | Cleary et al. ................... | 169/53 |

FOREIGN PATENT DOCUMENTS

| JP | H04-067463 | 6/1992 |
| JP | H07-039855 | 7/1995 |
| JP | 2003-117016 | 4/2003 |
| JP | 2006-212346 | 8/2006 |
| JP | 2008-119303 | 5/2008 |

* cited by examiner

*Primary Examiner* — Dinh Q Nguyen
(74) *Attorney, Agent, or Firm* — Berenato & White, LLC

(57) ABSTRACT

A fire extinguishing equipment for extinguishing cooking oil fires includes fire extinguishing agent, a single-layer hot-melt resin film enclosing the fire extinguishing agent, at least one float, and a quadratic prism-shaped paper case enclosing the single-layer hot-melt adhesive film and the at least one float. The quadratic prism-shaped paper case includes a plurality of sides, at least one of which has al least one outlet.

15 Claims, 3 Drawing Sheets

RESIN LAMINATED FILM FOR ENCLOSING FIRE EXTINGUISHING AGENT AND FIRE EXTINGUISHING EQUIPMENT UTILIZING THE SAME

BACKGROUND OF THE INVENTION

1. Field of the invention

The present invention generally relates to a fire extinguishing equipment in case of frying oil fire. To be more specific, the present invention relates to a fire extinguishing equipment utilizing a resin laminated film for enclosing fire extinguishing agent which can be directly thrown to cooking utensils such. as pots in case of frying oil fire.

2. Description of the Related Art

Presently, there is a method for extinguishing domestic frying oil fire by throwing fire extinguishing agent made of potassium carbonate aqueous solution enclosed in a hot-melt or hot-fracture resin containers directly into cooking utensils. This method promotes saponification reaction between fire extinguishing agent and frying oil that high temperature oil is rapidly converted to non-flammable soap.

However, there has been a chance of phreatic explosion due to moisture expansion of fire extinguishing agent if fire extinguishing agent in a resin container flows down in a cooking utensil without reacting with oil and gets heated at the bottom of the cooking utensil.

In this regard, Japanese Unexamined Patent Publication 2008-119303 discloses fire extinguishing agent with a saponifier containing surfactant and potassium carbonate to which a thickener such as polysaccharide gum is added to reduce a chance of phreatic explosion.

SUMMARY OF THE INVENTION

The object of the present invention is to provide an affordable and safe fire extinguishing equipment without changing the ingredients of the prior fire extinguishing agent but by changing the components of a resin container in which fire extinguishing agent is enclosed and further comprising a paper case for enclosing the resin container and floats.

The first aspect of the present invention solving the problem relates to a resin laminated film for enclosing fire extinguishing agent, comprising a plurality of hot-melt resin films which are laminated at least two layers in the order of highest melting point to lowest melting point from the side that contacts frying oil.

In a preferred embodiment of the present invention, the resin laminated film comprises two-layer resin films wherein Layer B which contacts frying oil is vmPET12 and Layer C which contacts fire extinguishing agent is LLDPE50.

In another preferred embodiment of the present invention, the resin laminated film comprises three-layer resin films wherein Layer A which contacts frying oil is PET12, Layer B which is placed in between the Layer A and the Layer C is vmPET12, and Layer C which contacts fire extinguishing agent is LLDPE50.

The second aspect of the present invention solving the problem relates to a fire extinguishing equipment wherein fire extinguishing agent is enclosed in the resin laminated film of the present invention, and its circumferences are adhered by thermocompression bonding.

In another preferred embodiment of the present invention, the fire extinguishing equipment further comprises a paper case for enclosing the fire extinguishing equipment, and the said paper case provides few outlets on at least one set of corresponding faces for fire extinguishing agent to seep through them.

In another preferred embodiment of the present invention, the paper case has a cubic shape.

In another preferred embodiment of the present invention, the paper case further comprises a vaulted shaped float.

In another preferred embodiment of the present invention, the paper case further comprises a triangular prism shaped float.

In another preferred embodiment of the present invention, a fire extinguishing equipment comprises a single-layered hot-melt resin film wherein fire extinguishing agent is enclosed, at least one float, and a quadrangular prism shaped paper case with outlets wherein the single-layered hot-melt resin film and the at least one float are enclosed.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A description will be given below, of a resin laminated film for enclosing fire extinguishing agent and fire extinguishing equipment utilizing the same according to the embodiments of the present invention with reference to attached drawings.

[First Embodiment]

Figure 1:
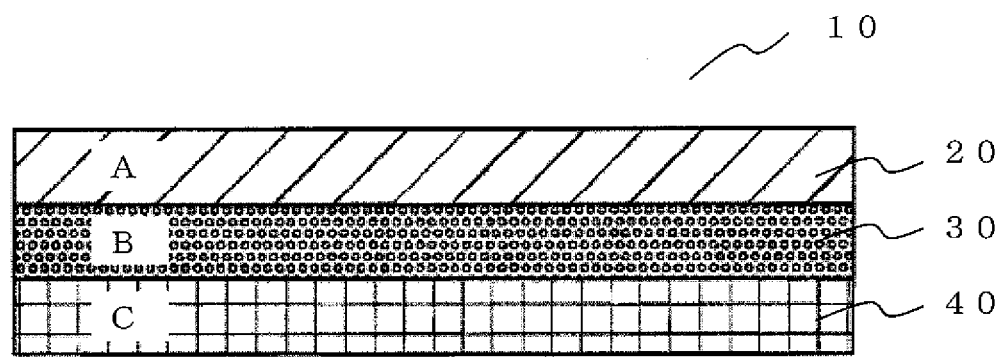
FIG. 1 illustrates a composition of a resin laminated film according to the first embodiment of the present invention.
Figure 2:
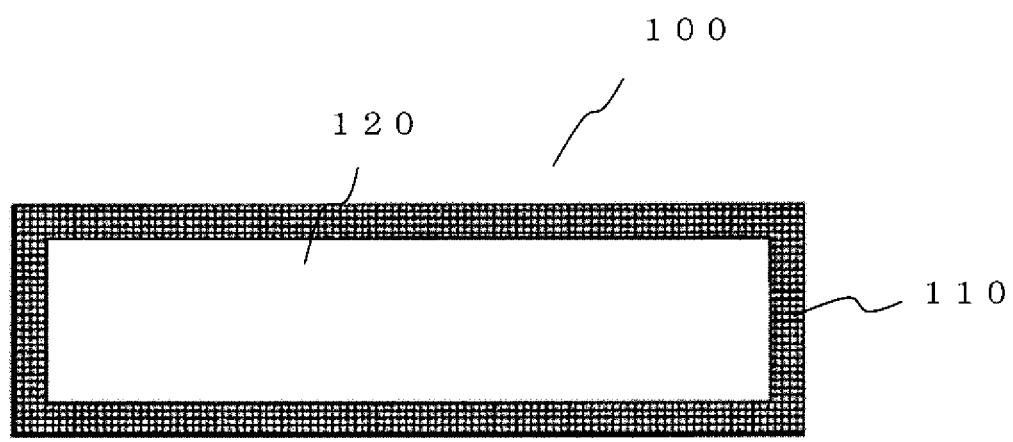
FIG. 2 is a plain view of a fire extinguishing equipment according to the first embodiment of the present invention.
Figure 3:
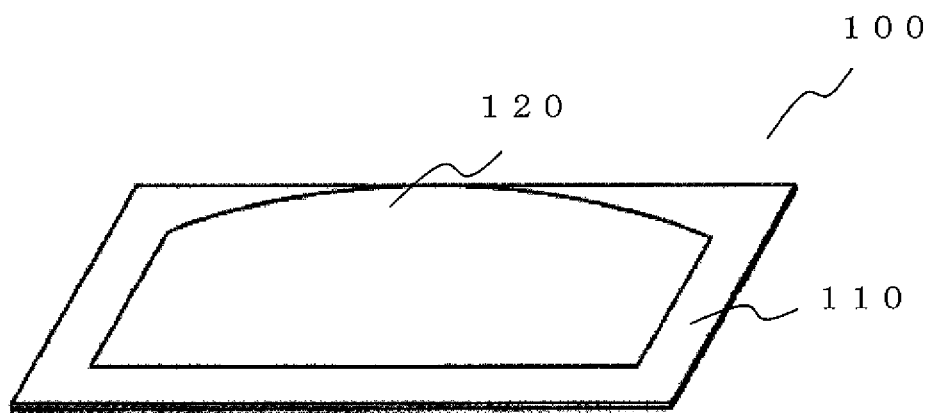
FIG. 3 is a perspective view of a fire extinguishing equipment according to the first embodiment of the present invention.

First, a description will be given, of a resin laminated film according to a first embodiment of the present invention with reference to FIGS. 1 to 3. FIG. 1 shows a composition of a resin laminated film 10 according to a first embodiment of the present invention. FIG. 2 is a plain view of a fire extinguishing equipment utilizing the resin laminated film of FIG. 1. FIG. 3 shows a perspective view of the fire extinguishing equipment shown in FIG. 2. As shown in FIG. 1, the resin laminated film 10 according to a first embodiment of the present invention comprises three-layer resin films 20, 30, and 40, each having a different melting point. The resin films 20, 30, and 40 are respectively PET 12 (A) which is the outermost layer directly contacts with frying oil, vmPET 12 (B) which is the middle layer, and LLDPE 50 (C) which is the innermost layer contacts with fire extinguishing agent. The number shown with each resin film indicates the thickness of the films in micrometer.

PET is polyethylene terephthalate which is saturated thermoplastic polyester wherein acid component is terephthalic acid and glycolic component is ethylene glycol. Polyethylene terephthalate has a melting point of approximately 260 degrees C and is a crystalline polymer which has high durability and heat resistance.

VmPET is vacuum metalized polyethylene terephthalate in which aluminum is evaporated by heating under high vacuum condition and its vapor is deposited to the surface of the film. Accordingly, vmPET has high gas barrier and moisture-proof property, and also high adhesion strength between vm membrane and PET.

LLDPE is linear low density polyethylene, and it copolymerizes with ethylene and alpha-olefin (propylene, butene, hexene, octene, 4-methylpentene, etc.) which has more carbons than ethylene does. Short-chain branch is introduced in this process that it becomes polyethylene with low density. The melting point is approximately 120 degrees C.

The above-mentioned composition enables the LLDPE 50 film (C) which has the lowest melting point to melt at first, and then the vmPET 12 middle layer (B) whose melting point is higher than LLDPF 50 and lower than PET 12 to melt next, and then PET 12 (A) whose melting point is the highest of all films (A), (B), and (C) to melt at last. Accordingly, fire extinguishing agent inside can gradually leak out of the resin laminated film.

Alternatively, the resin laminated film of the present invention can be comprised of two-layer films vmPET 12 (B) (outer layer which contacts frying oil) and LLDPE 50 (C) (inner layer which contacts fire extinguishing agent), omitting PET 12 (A).

FIGS. 2 and 3 respectively show plain and perspective views of the fire extinguishing equipment 100 utilizing the resin laminated film of FIG. 1. In the embodiment of the present invention, two sets of rectangular shaped resin laminated film 10 which are laminated in aforesaid order are prepared. The area where fire extinguishing agent is enclosed is shown as fire extinguishing agent filling area 120 in FIGS. 2 and 3. In these figures, all circumferences 110, namely four sides are adhered by thermocompression bonding.

Alternatively, a single rectangular shaped resin laminated film 10 which is laminated in aforesaid order can be folded in half and all circumferences 110 are adhered by thermocompression bonding. Alternatively, the side which was folded in half needs not be adhered by thermocompression since the film can be sealed only by adhering three sides. The method for enclosing fire extinguishing agent in the resin laminated film can be arbitrarily selected by a skilled person in the art.

From the above explanation, the fire extinguishing equipment 100 utilizing the resin laminated film of the present invention can prevent phreatic explosion and promote safe fire extinguishing since fire extinguishing agent evenly and gradually seeps out from all directions of the resin laminated film 10.

[Second Embodiment]

Figure 4:
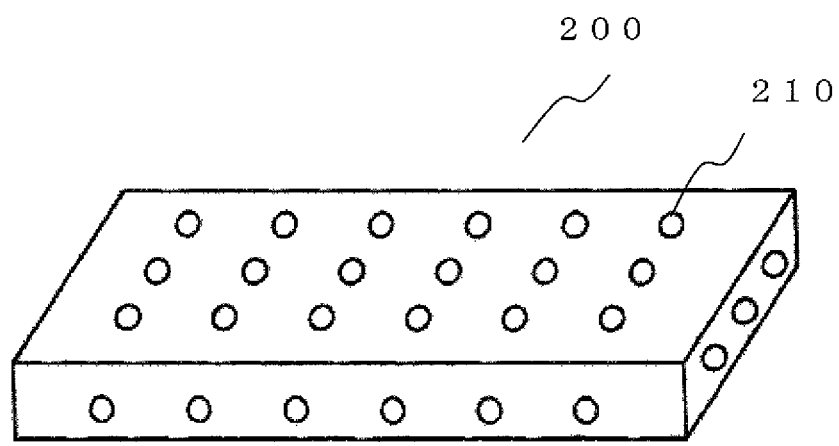
FIG. 4 is a perspective view of a paper case according to the second embodiment of the present invention.

FIG. 4 shows a perspective view of a paper case 200 in which fire extinguishing equipment 100 is enclosed according to the second embodiment of the present invention. In this embodiment, outlets 210 are evenly provided on all faces of a quadrangular prism shaped box that fire extinguishing agent is gradually seeps out from the outlets 210. Alternatively, the outlets need not be provided on all six faces, but need to be provided on at least one set of corresponding faces. In this case, corresponding faces means top and bottom faces, right and left faces, and back and front faces.

This paper case 200 not only provides more stable flow of fire extinguishing agent into the cooking utensils, but also makes it easier for users to throw the fire extinguishing equipment 100 into the cooking utensils in case of fire.

Accordingly, even safer fire fighting can be achieved when the paper case 200 is used with the fire extinguishing equipment 100.

[Third Embodiment]

Figure 5:
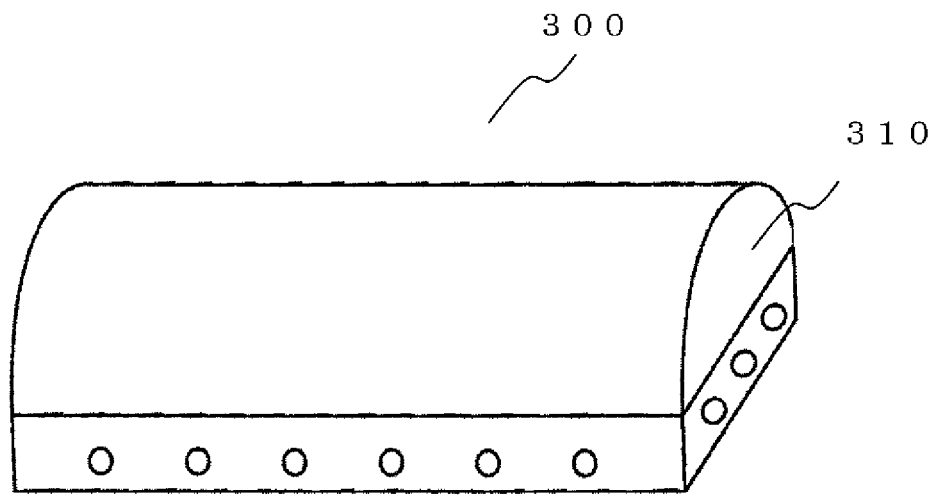
FIG. 5 is a perspective view of a paper case with a vaulted shaped float according to the third embodiment of the present invention.

FIG. 5 shows a perspective view of a paper case 300 according to the third embodiment of the present invention. In this embodiment, the paper case 300 consists of a paper case 200 in the second embodiment in which fire extinguishing equipment 100 is enclosed and a vaulted shaped float 310 attached on one of the faces of the paper case 200. The fire extinguishing equipment 100 in the paper case 200 floats due to the vaulted shaped float 310 since it stays upward in the cooking utensils regardless of the direction thrown into the cooking utensils. This can extend the duration time the fire extinguishing equipment 100 stays in the surface of oil. The vaulted shaped float 310 is made from the same material as the paper case 200 in this embodiment, however, any material which proves safety and function can be used.

Moreover, the shape of the float is not limited to the vaulted shape shown in this embodiment. For instance, the shapes of the float can be triangular prism or quadrangular prism shaped box.

[Fourth Embodiment]

Figure 6:
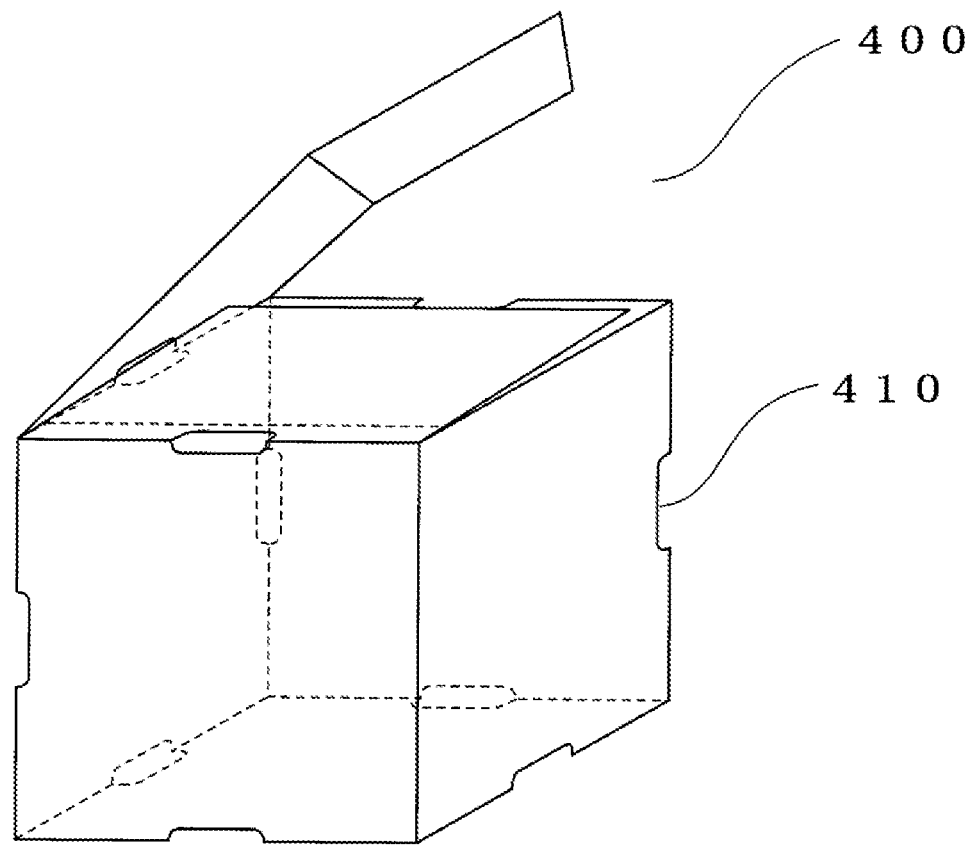
FIG. 6 is a perspective view of a cubic shaped paper case according to the fourth embodiment of the present invention.

FIG. 6 is a perspective view of a cubic shaped paper case 400 according to the fourth embodiment of the present invention. In this cubic shaped paper case 400, a single-layered hot-melt resin film wherein fire extinguishing agent is enclosed and a float are enclosed.

In this embodiment, the length of one side of a cubic shaped paper case 400 is 5.4 cm. The cubic shaped paper case 400 is made of a plurality of sides intersection one another at edges. As clearly shown in FIG. 6, outlets 410 are provided in the middle of each side (or edges) of a cubic shaped paper case 400 except for two sides (or edges), one of which is an opening of the paper case 400 and the other is where a float is placed.

A single-layered hot-melt resin film is made of thick PET (polyethylene terephthalate). This single-layered PET film is formed in a rectangular shape and folded in half and all circumferences 110 are adhered by thermocompression bonding. Alternatively, the side which was folded in half needs not be adhered by thermocompression since the film can be sealed only by adhering three sides.

The length of each outlet 410 is 1.6 cm for this embodiment. A float enclosed in a cubic shaped paper case 400 is comprised of a quadrangular prism shaped box which has the size of 4.6 cm height, 2.4 cm width, and 2.4 cm depth.

According to this embodiment, the duration time a cubic shaped paper case 400 stays in the surface of frying oil can be extended because of a float placed inside of a cubic shaped paper case 400. Moreover, fire extinguishing agent can gradually seep out from the outlets 410 of a cubic shaped paper case 400. Therefore, a cubic shaped paper case 400 not only provides more stable flow of fire extinguishing agent, but also simplifies the composition of a resin film in which fire extinguishing agent is enclosed and that reduces cost of manufacturing fire extinguishing equipment.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. Fire extinguishing equipment for extinguishing a cooking oil fire, comprising:
   fire extinguishing agent;

a single-layer hot-melt resin film enclosing the fire extinguishing agent;
at least one float; and
a quadrangular prism-shaped paper case enclosing the single-layer hot-melt adhesive film and the at least one float, the single-layer hot-melt resin film enclosing the fire extinguishing agent, the quadrangular prism-shaped paper case comprising a plurality of sides, a first side of the plurality of sides being adapted to opened and closed for placing the single-layer hot-melt adhesive film and the at least one float into the quadrangular prism-shaped paper case, at least a second side of the plurality of sides having at least one outlet,
wherein the fire extinguishing equipment is configured to be thrown directly on the cooking oil fire, and wherein the at least one float is configured to extend a duration of time in which the quadrangular prism-shaped paper case remains on a surface of the cooking oil fire as the fire extinguishing agent seeps through the at least one outlet.

2. The fire extinguishing equipment of claim 1, wherein the single-layer hot-melt resin film comprises polyethylene terephthalate.

3. The fire extinguishing equipment of claim 1, wherein the quadrangular prism-shaped paper case has a cubic shape, wherein the sides each have a length of 5.4 cm, and wherein the at least one outlet is provided in the middle of the at least one side.

4. The fire extinguishing equipment of claim 1, wherein the at least one float has a quadrangular prism shape with a size of 4.6 cm×2.4 cm×2.4 cm.

5. The fire extinguishing equipment of claim 1, wherein the sides intersect one another at edges, and wherein the at least one outlet is provided in the middle of at least one of the edges.

6. Fire extinguishing equipment for extinguishing a cooking oil fire, comprising:
fire extinguishing agent;
a single-layer hot-melt resin film enclosing the fire extinguishing agent;
at least one float; and
a quadrangular prism-shaped paper case enclosing the single-layer hot-melt adhesive film and the at least one float, the single-layer hot-melt resin film enclosing the fire extinguishing agent, the quadrangular prism-shaped paper case comprising a plurality of sides, a first side of the plurality of sides being adapted to be opened and closed for placing the single-layer hot-melt adhesive film and the at least one float into the quadrangular prism-shaped paper case, at least second and third sides of the plurality of the sides having respective outlets,
wherein the fire extinguishing equipment is configured to be thrown directly on the cooking oil fire, and wherein the at least one float is configured to extend a duration of time in which the quadrangular prism-shaped paper case remains on a surface of the cooking oil fire as the fire extinguishing agent seeps through the outlets.

7. The fire extinguishing equipment of claim 6, wherein the single-layer hot-melt resin film comprises polyethylene terephthalate.

8. The fire extinguishing equipment of claim 6, wherein the quadrangular prism-shaped paper case has a cubic shape, wherein the sides each have a length of 5.4 cm, and wherein the outlets are provided in the middle of the sides.

9. The fire extinguishing equipment of claim 6, wherein the at least one float has a quadrangular prism shape with a size of 4.6 cm×2.4 cm×2.4 cm.

10. The fire extinguishing equipment of claim 6, wherein the sides intersect one another at edges, and wherein the outlets are respectively provided in the middle of a plurality of the edges.

11. Fire extinguishing equipment for extinguishing a cooking oil fire, comprising:
fire extinguishing agent;
a single-layer hot-melt resin film enclosing the fire extinguishing agent;
at least one float; and
a quadrangular prism-shaped paper case enclosing the single-layer hot-melt adhesive film and the at least one float, the single-layer hot-melt resin film enclosing the fire extinguishing agent, the quadrangular prism-shaped paper case comprising a plurality of sides intersecting one another at a plurality of edges, wherein a first side of the plurality of sides is adapted to be opened and closed for placing the single-layer hot-melt adhesive film and the at least one float into the quadrangular prism-shaped paper case, and wherein all but first and second edges of the plurality of edges have respective outlets,
wherein the fire extinguishing equipment is configured to be thrown directly on the cooking oil fire, and wherein the at least one float is configured to extend a duration of time in which the quadrangular prism-shaped paper case remains on a surface of the cooking oil fire as the fire extinguishing agent seeps through the outlets.

12. The fire extinguishing equipment of claim 11, wherein the single-layer hot-melt resin film comprises polyethylene terephthalate.

13. The fire extinguishing equipment of claim 11, wherein the quadrangular prism-shaped paper case has a cubic shape, wherein the sides each have a length of 5.4 cm, and wherein the outlets are provided in the middle of all of the edges except the first and second edges.

14. The fire extinguishing equipment of claim 11, wherein the at least one float has a quadrangular prism shape with a size of 4.6 cm×2.4 cm×2.4 cm.

15. The fire extinguishing equipment of claim 11, wherein the first edge corresponds to an opening of the quadrangular prism-shaped paper case, and wherein the second edge corresponds to a position of the at least one float.

\* \* \* \* \*